United States Patent
Conner et al.

(10) Patent No.: US 7,414,522 B2
(45) Date of Patent: Aug. 19, 2008

(54) ADAPTIVE DECODE STRATEGY FOR REMOTE KEYLESS ENTRY AND TIRE PRESSURE MONITORING SYSTEM

(75) Inventors: Bruce Conner, Dearborn, MI (US); John Nantz, Brighton, MI (US); Zoran Kovac, Macomb Township, MI (US)

(73) Assignee: Lear Corporation, Southfield, MI (US)

( * ) Notice: Subject to any disclaimer, the term of this patent is extended or adjusted under 35 U.S.C. 154(b) by 303 days.

(21) Appl. No.: 11/217,745

(22) Filed: Sep. 1, 2005

(65) Prior Publication Data

US 2007/0046447 A1  Mar. 1, 2007

(51) Int. Cl.
*B60C 23/00* (2006.01)

(52) U.S. Cl. ............. 340/447; 340/426.33; 340/825.69; 375/324; 375/341

(58) Field of Classification Search ................. 340/5.8, 340/426.33, 825.69, 5.61, 825.72, 447, 825.22; 307/6.1; 341/176; 714/822; 370/514, 442, 370/485; 375/324, 347, 285, 299, 357, 365, 375/341

See application file for complete search history.

(56) References Cited

U.S. PATENT DOCUMENTS

| | | | |
|---|---|---|---|
| 5,144,296 A * | 9/1992 | DeLuca et al. ............. 340/7.35 |
| 5,631,962 A * | 5/1997 | Balph et al. .................. 713/170 |
| 5,881,153 A | 3/1999 | Feldman et al. |
| 6,236,333 B1 | 5/2001 | King |
| 6,320,514 B1 | 11/2001 | Flick |
| 6,617,961 B1 * | 9/2003 | Janssen et al. ............... 340/5.8 |
| 6,647,773 B2 | 11/2003 | Nantz et al. |
| 6,687,314 B1 * | 2/2004 | Leonard et al. ............. 375/324 |
| 6,864,800 B2 | 3/2005 | Leichtfried et al. |
| 2005/0063495 A1* | 3/2005 | Volker ........................ 375/341 |

FOREIGN PATENT DOCUMENTS

| | | |
|---|---|---|
| GB | 2375417 A | 11/2002 |
| JP | 2003244013 A | 8/2003 |
| WO | 0147302 A1 | 6/2001 |

OTHER PUBLICATIONS

Combined Search and Examination Report under Sections 17 and 18(3), Oct. 27, 2006, Application No. GB0617032.8.

* cited by examiner

*Primary Examiner*—Brent Swarthout
(74) *Attorney, Agent, or Firm*—Brooks Kushman P.C.

(57) ABSTRACT

A system and method for decoding signals from a tire pressure monitoring (TPM) system and a remote keyless entry (RKE) system includes determining a signal strength of the signal. The method also includes evaluating at least a first bit and the signal strength of the signal. The method further includes determining a first bit threshold based on the evaluated first bit and the signal strength. The method includes storing the first data bit threshold in a memory of the controller and determining a logic state of a second bit of a signal based on the first data bit threshold.

15 Claims, 3 Drawing Sheets

ADAPTIVE DECODE STRATEGY FOR REMOTE KEYLESS ENTRY AND TIRE PRESSURE MONITORING SYSTEM

TECHNICAL FIELD

The present invention relates to a system and method for decoding signals generated by a remote keyless entry (RKE) system and tire pressure monitoring (TPM) system.

BACKGROUND

Remote keyless entry (RKE) systems and tire pressure monitoring (TPM) systems are commonly installed on vehicles. The RKE and TPM systems include a transmitter, which transmits encoded signals or commands that are received by a receiver within the vehicle. As such, the vehicle receiver is configured to decode the receive signals and provide the decoded signal to a microprocessor within the vehicle for execution of the commands.

The encoded signals generated by the transmitter are conventionally in binary form. For example, the transmitted signal includes a digital data stream of logic one and logic zero bits. With the conventional systems, the criteria for determining whether a bit within the transmitted signal is a logic one or a logic zero is via a fixed threshold. Although the conventional RKE and TPM systems are configured to receive and decode the transmitted signal, there exists a wide horizon for improvement.

It is well known that under certain conditions, when utilizing the fixed threshold, the transmitted logic bits may be incorrectly interpreted by the receiver. For example, certain weather or atmospheric conditions cause the signal strength of the transmitted signal to be compromised which affects the interpretation of the transmitted signal. Thus, it is possible for a logic one bit to be interpreted as a logic zero bit and a logic zero bit to be interpreted as a logic one bit, thereby causing undesired performance of the RKE and TPM system.

The present invention was conceived in view of these and other disadvantages of conventional decoding strategies for RKE and TPM system signals.

SUMMARY

The present invention provides a system and method for decoding signals from a tire pressure monitoring (TPM) system and a remote keyless entry (RKE) system. The method includes determining a signal strength of the signal. The method also includes evaluating at least a first bit and the signal strength of the signal. The method further includes determining a first bit threshold based on the evaluated first bit and the signal strength. The method includes storing the first data bit threshold in a memory of the controller and determining a logic state of a second bit of a signal based on the first data bit threshold.

The above embodiments and other embodiments, features, and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood with reference to the following description, taken in connection with the accompanying drawings in which:

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ in the present invention.

Figure 1:
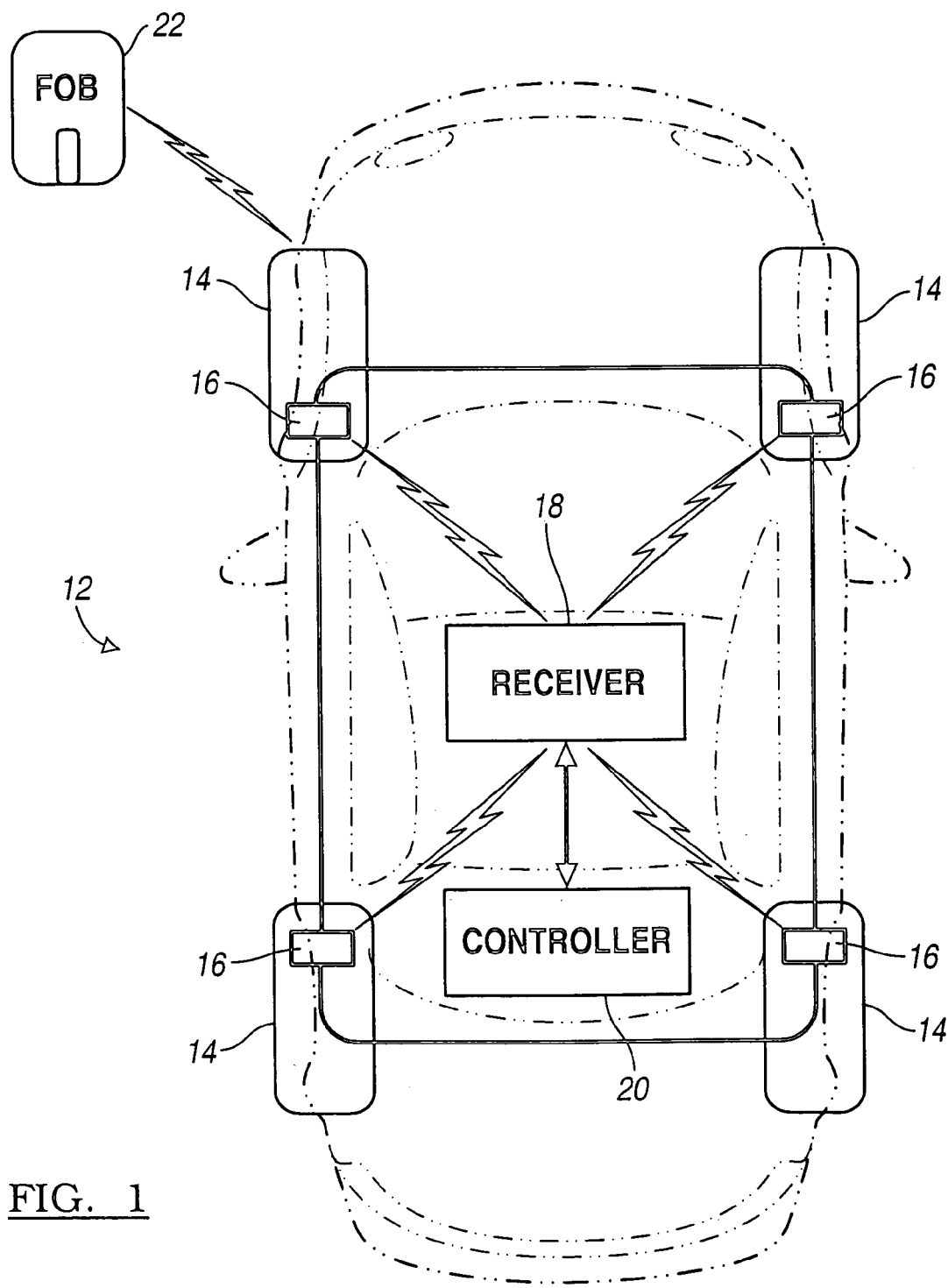
FIG. 1 depicts a vehicle diagram having a receiver and controller for receiving and decoding signals from a tire pressure monitoring (TPM) system and a remote keyless entry (RKE) system according to an embodiment of the present invention.

Now referring to FIG. 1, a system diagram is illustrated that enables the reception of signals from a tire pressure monitoring (TPM) system and a remote keyless entry (RKE) system in a manner that reduces the occurrence of erroneous signal interpretation. As such, a vehicle 12 is shown that has sets of wheels 14. Tire pressure sensors 16 are integrated with wheels 14. In one embodiment, tire pressure sensors 16 may be directly coupled to or integrated with a valve stem (not shown) of wheels 14. Tire pressure sensors 16 are configured to sense the tire pressure of wheels 14 and wirelessly transmit a signal that is indicative of the sensed tire pressure to a receiver 18. Accordingly, receiver 18 transmits the tire pressure sensor information to a controller 20. Controller 20 is configured to process and decode the signals received from receiver 18 and determine the condition of wheels 14 (e.g., over-inflated or under-inflated). Following decoding of the signals, controller 20 is further configured to generate signals that enable a display (not shown) on vehicle to notify a vehicle operator of the condition of wheels 14.

A key fob 22 (hereinafter referred to as "fob") is operable with vehicle 12 for controlling various vehicle functions. For example, fob 22 may be configured to enable locking and/or unlocking of the doors on vehicle 12. Fob 22 may also be capable of starting an engine, as well as activating an alarm system located on vehicle 12. Fob 22 may include buttons that invoke various commands vehicle 12 when pressed. Additionally, in an alternative embodiment, fob 22 may be configured to generate commands that invoke various vehicle functions by being placed within close proximity of vehicle 12. In either embodiment, signals transmitted from fob 22 may be received by receiver 18 and supplied to controller 20 for decoding and processing. Accordingly, fob 22, being operable with receiver 18 and controller 20 comprise a remote keyless entry (RKE) system.

Figure 2:
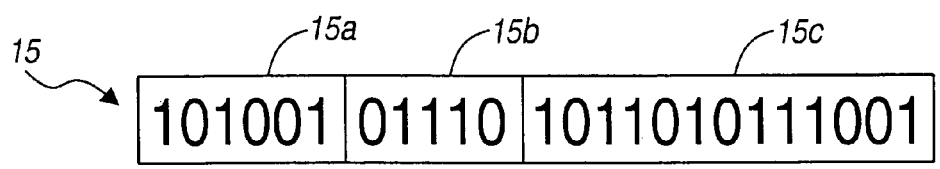
FIG. 2 illustrates an exemplary signal data stream that may be received by the receiver of FIG. 1 in accordance with an embodiment of the present invention.

Referring to FIG. 2, a non-limiting example of a signal or data stream 15 that may be transmitted by tire pressure sensors 16 and fob 22 is shown. In one aspect of the invention, data stream 15 may have a format that includes a preamble section 15a, a header section 15b, and a data section 15c. As described above, tire pressure sensors 16 and fob 22 transmit signals that include data stream 15 to controller 20 via receiver 18 for decoding. Controller 20 is configured to have a memory for storing data sent via tire pressure sensors 16 and fob 22. As will be described hereinafter, controller 20 may store data sent via tire pressure sensor 16 and fob 22 within a look-up table.

Figure 3:
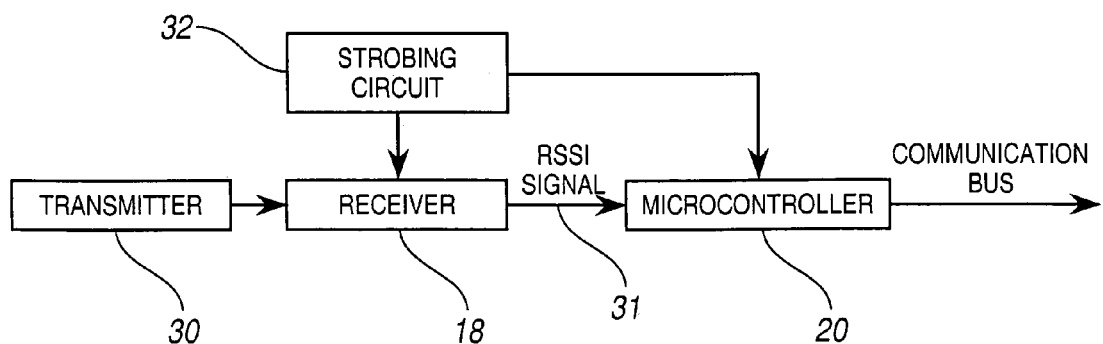
FIG. 3 illustrates a detailed system block diagram of an RKE and TPM decoding system according to an embodiment of the present invention.

Now referring to FIG. 3, a detailed system block diagram of the TPM and RKE system is illustrated. Fob 22 and tire pressure sensors 16 (FIG. 1) are collectively referred to as transmitter 30. As described above, transmitter 30 generates signals that are received by receiver 18 and controller 20. Receiver 18 and controller 20 are responsive to signals generated by a strobing circuit 32. Strobing circuit 32 is configured to conserve power that is supplied to receiver 18 and controller 20 by allowing the flow of current from a power source to receiver 18 and controller 20 when signals from transmitter 30 are received. Accordingly, when receiver 18 receives the signal from transmitter 30, receiver 18 is configured to generate a received signal strength indicator (RSSI) signal 31, which is proportional to the power of the signal transmitted by the transmitter 30. Accordingly, controller 20 receives RSSI signal 31 along with the data stream transmitted by transmitter 30.

Controller 20 evaluates RSSI signal 31 and the data stream transmitted by transmitter 30. Accordingly, in one aspect of the present invention, the preamble bits and the header bits of the data stream are measured along with the RSSI signal. As such, based on the evaluated data stream and RSSI signal, controller 20 sets a first data bit threshold and stores the first data bit threshold in memory. In one embodiment, the first data bit threshold is stored within a look-up table within controller 20. Accordingly, a first data bit within the data section of the data stream is evaluated based on the first data bit threshold. In one embodiment, the first data bit is evaluated by measuring the first data bit and comparing it with the first data bit threshold. Based on the comparison of the first data bit to the first data bit threshold, controller 20 determines the logic state of the first data bit. Accordingly, in one embodiment the logic state may be a logic one or a logic zero. Additionally, having evaluated and determined the logic state of the first data bit, controller 20, based on the first data bit threshold and the measured first data bit, determines a second data bit threshold. As such, a second data bit within the data section of the data stream is evaluated based on the second data bit threshold. Accordingly, based on the evaluation of the second data bit, controller 20 determines the logic state of the second data bit and stores a second data bit threshold within the look-up table stored by controller 20.

Having determined the first data bit threshold and second data bit threshold, controller 20 is configured to determine and set a third data bit threshold for a third data bit of the data stream. Accordingly, controller 20 measures the third data bit and based on the first data bit threshold and second data bit threshold, the logic state of the third data bit is determined. This process may be continued until all data bits within the data stream transmitted by transmitter 30 are evaluated to determine the logic state of each data bit.

Figure 4:
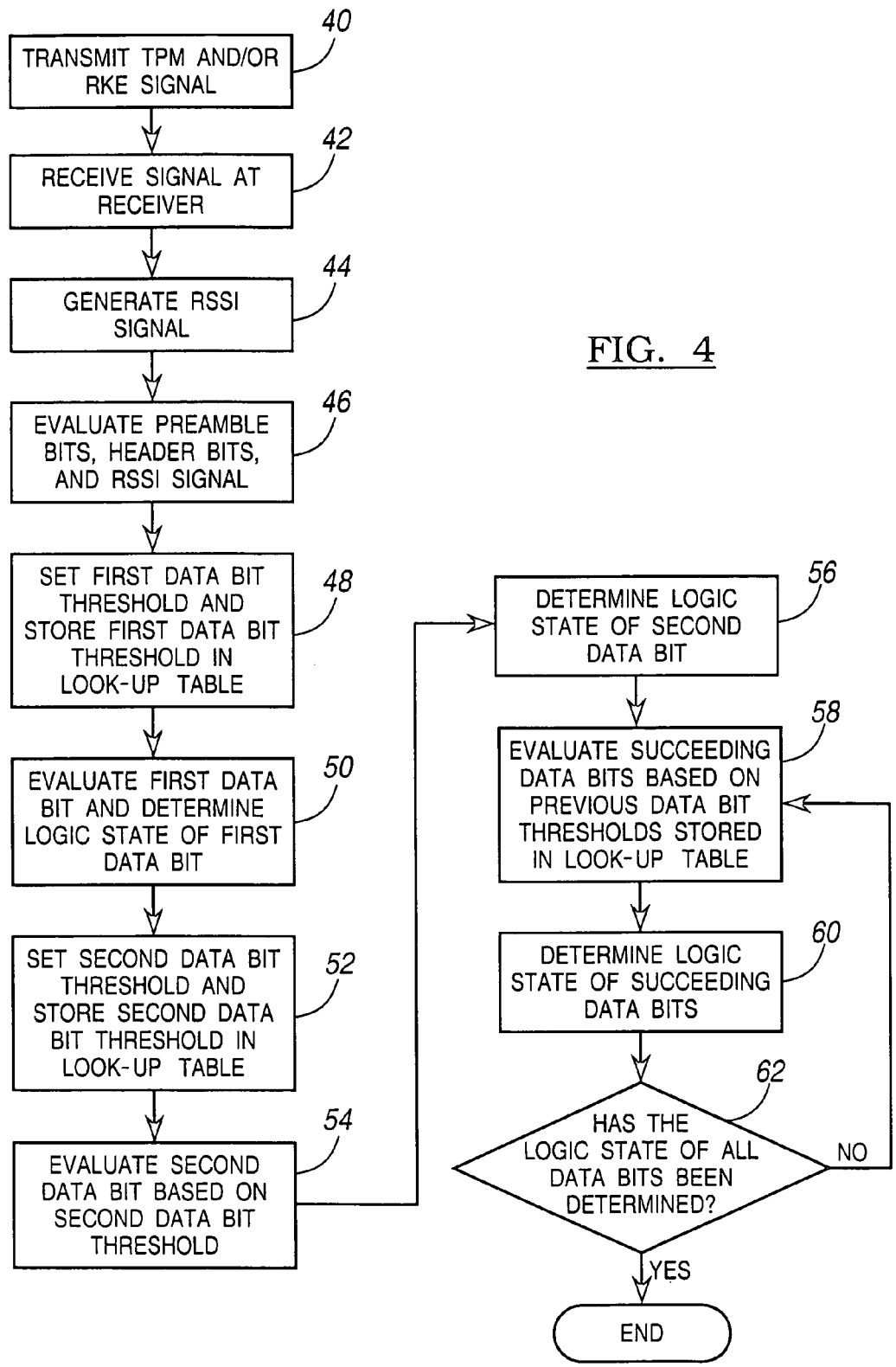
FIG. 4 illustrates a flow diagram of a methodology for decoding a signal generated by the RKE and TPM system of FIG. 1 in accordance with an embodiment of the present invention.

Now referring to FIG. 4, a flow diagram for a methodology of decoding signals transmitted by the TPM and RKE systems is illustrated. As depicted in block 40, the TPM and/or the RKE system transmit a signal. As depicted by block 42, the receiver receives the transmitted signal. As shown by block 44, the receiver generates the RSSI signal which is proportional to the power of the transmitted signal. As shown by block 46, the preamble bits, header bits, and RSSI signal are evaluated (i.e., measured). As depicted by block 48, based on the evaluation in block 46, a first data bit threshold is set and stored within a look-up table of the controller. As depicted by block 50, the first data bit is evaluated based on the first data bit threshold and accordingly, the logic state of the first data bit is determined. Block 52 depicts setting a second data bit threshold based on the logic state of the first data bit. In one embodiment the second data bit threshold may be determined based on the logic state of the first data bit and the first data bit threshold. In either embodiment, the second data bit threshold is stored within the look-up table. As depicted by block 54, the second data bit is evaluated based on the second data bit threshold. In one embodiment, evaluation of the second data bit includes measuring the second data bit. Block 56 depicts determining the logic state of the second data bit, which may include comparing the measured second data bit to the second data bit threshold.

Following block 56, block 58 occurs wherein succeeding data bits (i.e., a third, fourth, fifth data bit, etc.) are evaluated based on previous data bit thresholds stored within the look-up table. Based on this evaluation, the logic state of each succeeding data bit is determined as shown in block 60. Accordingly, as depicted by block 62, the method determines whether the logic state of all data bits has been determined. If the logic state of all data bits within the data stream has been determined, the method ends. If the logic state of all data bits within the data stream has not been determined, the method returns to block 58. As such, the method ends if the logic state of all data bits within the data stream has been determined.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for decoding first and second signals and each signal includes a plurality of bits, through the use of a controller, wherein the first signal is generated by a tire pressure monitoring (TPM) system and the second signal is generated by a remote keyless entry (RKE) system, the method comprising:

receiving the signal having the plurality of bits for each of the first and second signals, wherein the plurality of bits have a format that includes a preamble section, a header section, and a data section for each of the first and second signals;

generating a received signal strength indicator (RSSI) signal based on the first and second signals;

measuring bits of the preamble section and the header section for each of the first and second signals;

determining a first data bit threshold based on the measured preamble section bits and the header section bits for each of the first and second signals;

storing the first data bit threshold in a look-up table of the controller for each of the first and second signals;

measuring a first data bit of the data section for each of the first and second signals;

comparing the measured first data bit to the first data bit threshold for each of the first and second signals; and determining a logic state of the first data bit based on the comparison between the measured first data bit and the first data bit threshold for each of the first and second signals.

2. The method according to claim 1, further comprising:
determining a second data bit threshold based on the first data bit threshold and the logic state of the first data bit for each of the first and second signals;
measuring a second data bit for each of the first and second signals;
comparing the measured second data bit to the second data bit threshold for each of the first and second signals;
determining a logic state of the second data bit based on the comparison between the measured second data bit and the second data bit threshold for each of the first and second signals; and
storing the second data bit threshold in the look-up table of the controller for each of the first and second signals.

3. A method for decoding first and second signals and each having a plurality of bits, through the use of a controller, wherein the first signal is generated by a tire pressure monitoring (TPM) system and the second signal is generated by a remote keyless entry (RKE) system, the method comprising:
determining a signal strength of at least one of the first and the second signals;
evaluating at least a first bit and the signal strength of the at least one of the first and the second signals;
measuring bits of a preamble section and a header section of the at least one of the first and the second signals to evaluate the at least first bit and the signal strength;
determining a first data bit threshold based on the first bit and the signal strength;
storing the first data bit threshold in a memory of the controller; and
determining a logic state of a second bit of the at least one of the first and the second signals based on the first data bit threshold.

4. The method according to claim 3, wherein the logic state of the second bit includes the second bit being a logic zero or a logic one.

5. The method according to claim 3, wherein the second bit is a bit within a data section of the at least one of the first and the second signals.

6. The method according to claim 3, wherein determining the logic state of the second bit of the at least one of the first and the second signals based on the first data bit threshold includes determining a second data bit threshold based on the first bit; and
storing the second data bit threshold in the memory of the controller.

7. The method according to claim 3, wherein determining the signal strength of the at least one of the first and the second signals includes generating a received signal strength indicator (RSSI) signal for the at least one of the first and the second signals.

8. The method according to claim 3, wherein determining the at least one of the first and the second signals strength of the signal includes measuring a variance in pulse width between the plurality of bits for the at least one of the first and the second signals.

9. The method according to claim 3, wherein storing the first data bit threshold in a memory of the controller includes storing the first data bit within a look-up table located within the memory of the controller.

10. A vehicle system for decoding first and second signals and each having a plurality of bits, through the use of a controller, wherein the first signal is generated by a tire pressure monitoring (TPM) system and the second signal is generated by a remote keyless entry (RKE) system, the system being configured to:
determine a signal strength of at least one of the first and the second signals;
evaluate at least a first bit and the signal strength of the at least one of the first and the second signals;
measure bits of a preamble section and a header section of the at least one of the first and the second signals to evaluate the at least first bit and the signal strength;
determine a first data bit threshold based on the evaluated first bit and the signal strength;
store the first data bit threshold in a memory of the controller; and
determine a logic state of a second bit of the at least one of the first and the second signals based on the first data bit threshold.

11. The system according to claim 10, wherein the second bit is a bit within a data section of the at least one of the first and the second signals.

12. The system according to claim 10, wherein the system being configured to determine the logic state of the second bit of the at least one of the first and the second signals based on the first data bit threshold includes the system being configured to:
determine a second data bit threshold based on the evaluated first bit; and
store the second data bit threshold in the memory of the controller.

13. The system according to claim 10, wherein the system being configured to determine the signal strength of the signal includes the system being configured to generate a received signal strength indicator (RSSI) signal for the at least one of the first and the second signals.

14. The system according to claim 10, wherein the system being configured to determine the signal strength of the signal includes the system being configured to measure a variance in pulse width between the plurality of bits for the at least one of the first and the second signals.

15. The system according to claim 10, wherein the system being configured to store the first data bit threshold in a memory of the controller includes storing the first data bit threshold within a look-up table located within the memory of the controller.

* * * * *